United States Patent [19]
Shindo

[11] Patent Number: 6,052,529
[45] Date of Patent: Apr. 18, 2000

[54] DATA UPDATING METHOD USING OVERLAP AREA AND PROGRAM CONVERTING DEVICE FOR CONVERTING UPDATE PROGRAM IN DISTRIBUTED-MEMORY PARALLEL PROCESSOR

[75] Inventor: Tatsuya Shindo, Kawasaki, Japan

[73] Assignee: Fujitsu Limited, Kawasaki, Japan

[21] Appl. No.: 09/026,919

[22] Filed: Feb. 20, 1998

Related U.S. Application Data

[62] Division of application No. 08/575,890, Dec. 20, 1995, Pat. No. 5,764,993.

[30] Foreign Application Priority Data

Mar. 17, 1995 [JP] Japan .................................. 7-059151

[51] Int. Cl.[7] ...................................................... G06F 9/44
[52] U.S. Cl. ................................................................ 395/709
[58] Field of Search .............................. 395/709, 800.11, 395/800.14

[56] References Cited

U.S. PATENT DOCUMENTS

| | | | |
|---|---|---|---|
| 5,129,093 | 7/1992 | Muramatsu et al. ............... | 395/800.28 |
| 5,146,608 | 9/1992 | Hillis ......................................... | 712/22 |
| 5,303,357 | 4/1994 | Inoue et al. .............................. | 395/709 |
| 5,442,790 | 8/1995 | Nodenchuck ........................... | 395/709 |
| 5,457,799 | 10/1995 | Srivastava ............................... | 395/709 |
| 5,581,762 | 12/1996 | Hayashi et al. ........................ | 395/709 |
| 5,596,732 | 1/1997 | Hosoi ....................................... | 395/709 |
| 5,634,059 | 5/1997 | Zaiki ........................................ | 395/709 |
| 5,737,628 | 4/1998 | Birrittella et al. ................... | 395/800.11 |
| 5,742,843 | 4/1998 | Koyanagi et al. ................... | 395/800.14 |
| 5,765,011 | 6/1998 | Wilkinson et al. ................. | 395/800.02 |
| 5,808,690 | 9/1998 | Rich ......................................... | 345/505 |
| 5,850,489 | 12/1998 | Rich ......................................... | 382/304 |
| 5,870,619 | 2/1999 | Wilkinson et al. ..................... | 712/20 |
| 5,878,241 | 3/1999 | Wilkinson et al. ................... | 712/203 |

OTHER PUBLICATIONS

Gerndt, Work Distribution in Parallel Programs for Distributed Memory, 1991, 96–104.
Bozkus et al., Fortran 90D/HPF Compiler for Distributed Memory MIMD Computers: . . . , 1993 ACM, p. 351–360.
U.S. application No. 08/575,890, Shindo, filed Dec. 20, 1995.
Shibuya et al., Application Specific Massively Parallel Machine, 1990, 274–277.
Hudak et al. Beyond Loop Partitioning . . . , 1991, 172–178.

*Primary Examiner*—Tariq R. Hafiz
*Assistant Examiner*—John Q. Chavis
*Attorney, Agent, or Firm*—Staas & Halsey, LLP

[57] ABSTRACT

In a parallel processor, a local area and an overlap area are assigned to the memory of each processing element (PE), and each PE makes calculations to update the data in both areas at the runtime. If the data in the overlap area is updated in processes closed in the PEs, the data transfer between adjacent PEs can be reduced and the parallel processes can be performed at a high speed.

5 Claims, 23 Drawing Sheets

FIG. 1

```
1  !HPF$ processor p(4,4)
2       real a(256,256) , b
3  !HPF$ distribute a(block, block) on p
4
5       DO i=1, t
6         a(2:255,2:255) = b*(a(2:255,3:256)+a(2:255,1:254)+
                              a(3:256,2:255)+a(1:254,2:255))
7       ENDDO
8
```

FIG. 5

```
1  !HPF$ processor p(4)
2  real a(28) , b
3  !HPF$ distribute a(block) on p
4  DO i=0, time
5    a(2:27) = f(a(1:26),a(3:28))
6  ENDDO
```

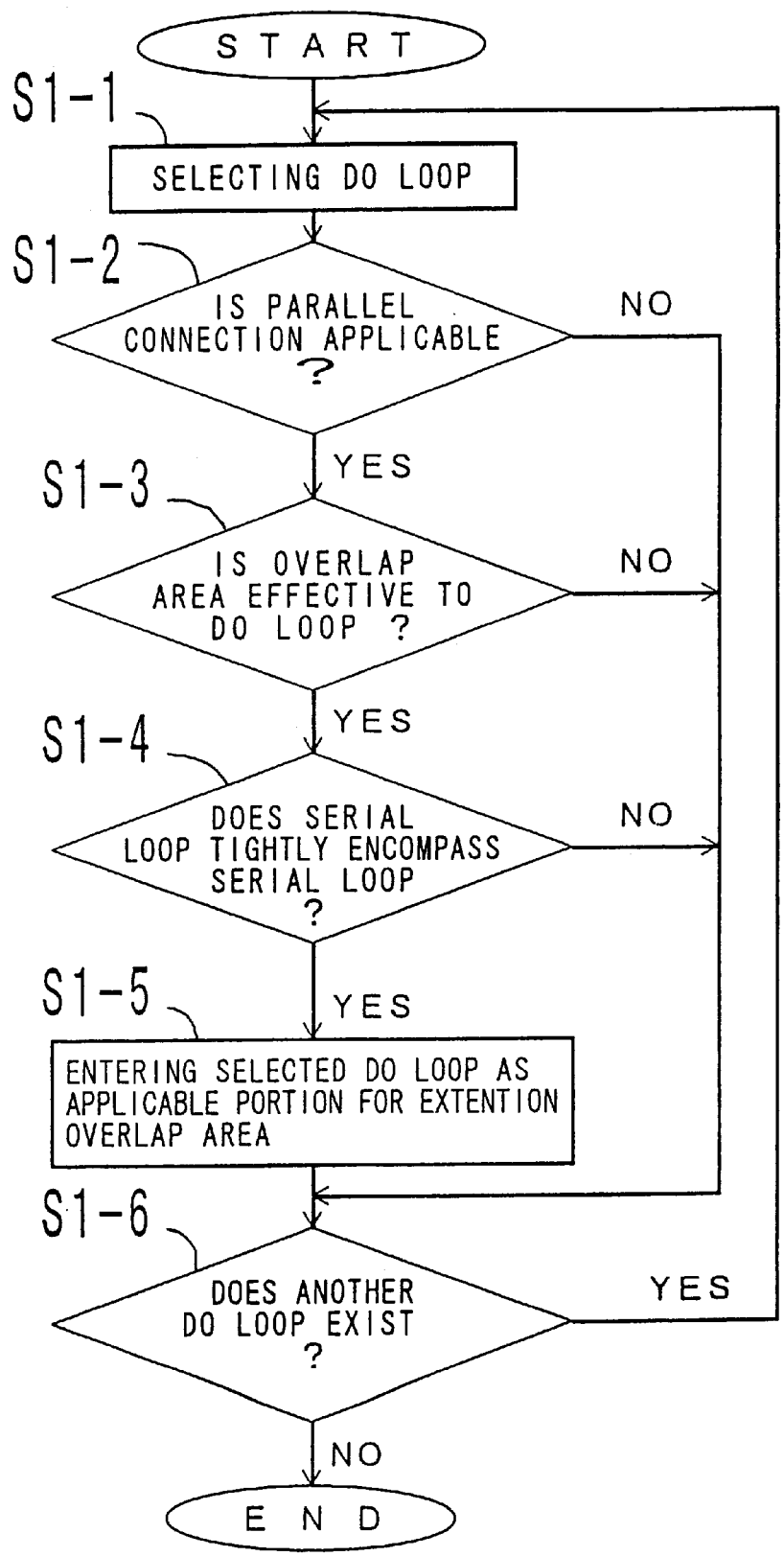
F I G. 1 2

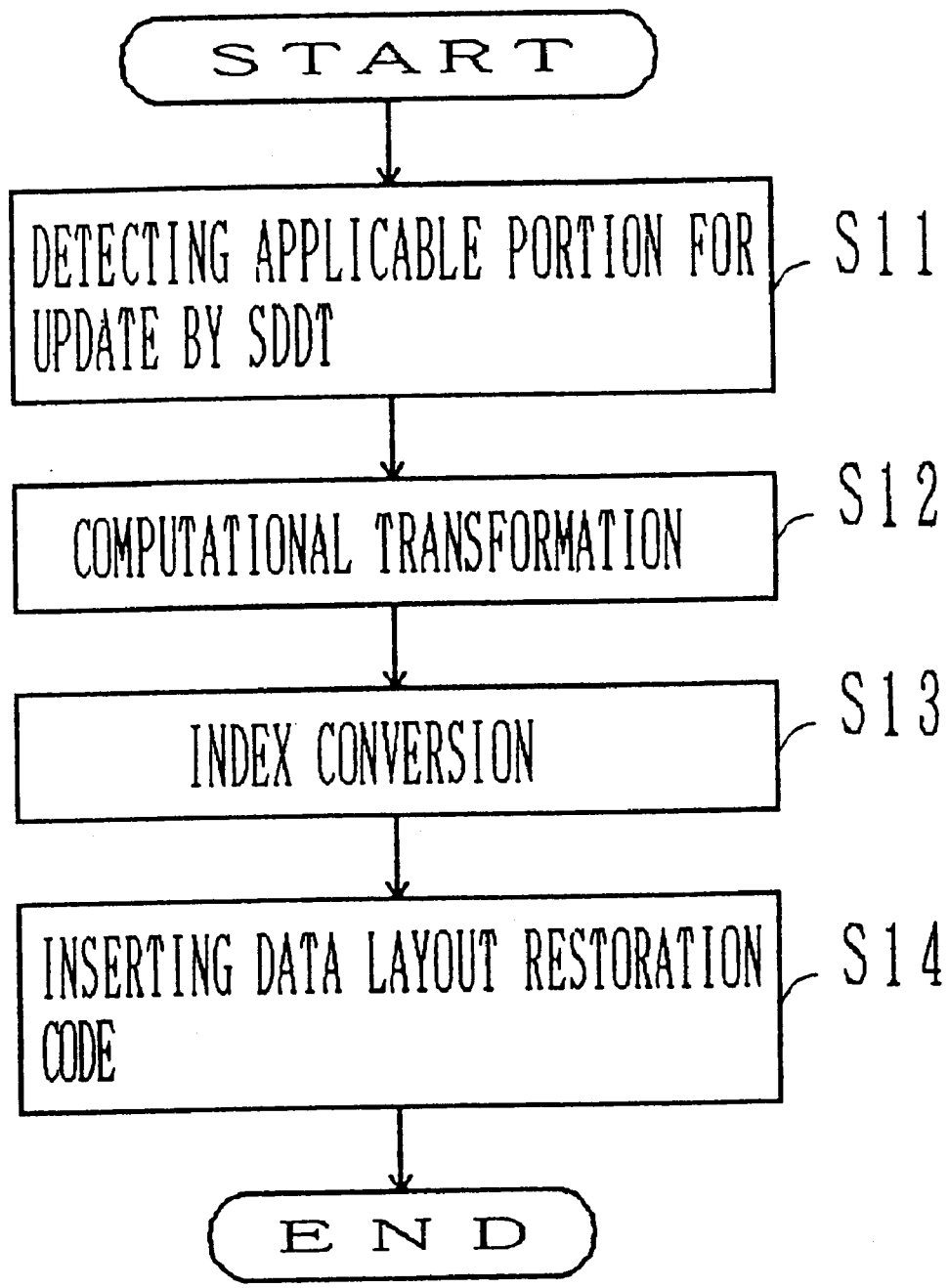
F I G. 17

```
DO i=0, time
   FORALL(j=0:25) a(j+2)=f(a(j+1),a(j+3))
ENDDO
```

F I G. 18

```
DO i'=0, time
   FORALL(j'=i':i'+25) a(-i'+j'+2)=f(a(-i'+j'+1),a(-i'+j'+3))
ENDDO
```

F I G. 19

```
DO i'=0, time
   FORALL(j'=i'-1:i'+26)
      IF(j'==i'-1 .OR. j'==i'+26) a(-i'+j'+2)=a(-i'+j'+2)
      ELSE                        a(-i'+j'+2)=f(a(-i'+j'+1),a(-i'+j'+3))
   ENDFORALL
ENDDO
```

FIG. 20

```
DO i'=0, time
   FORALL(J=i'-1:i'+26)
      IF(J==i'-1 .OR. J==i'+26) A(J+3)=A(J+2)
      ELSE                      A(J+3)=f(A(J+1),A(J+3))
   ENDFORALL
ENDDO
```

DATA UPDATING METHOD USING OVERLAP AREA AND PROGRAM CONVERTING DEVICE FOR CONVERTING UPDATE PROGRAM IN DISTRIBUTED-MEMORY PARALLEL PROCESSOR

This application is a Division of Ser. No. 08/575,890 filed on Dec. 20, 1995, now U.S. Pat. No. 5,764,993.

BACKGROUND OF THE INVENTION

1. Field of the Invention

The present invention relates to a method of executing a program at a high-speed through a distributed-memory parallel processor, and more specifically to a data updating method using an overlap area and a program converting device for converting a data update program.

2. Description of the Related Art

Recently, a parallel processor draws people's attention as a system of realizing a high-speed processor such as a super-computer in the form of a plurality of processing elements (hereinafter referred to as PE or processors) connected through a network. In realizing a high processing performance using such a parallel processor, it is an important problem to reduce the overheads of the data communications to the lowest possible level. One of the effective PE of reducing the overheads of the data communications between processors is to use an overlap area for specific applications.

The time required for data communications depends on the number of times of packet communications rather than the total volume of data. Therefore, integrating the communications and representing the messages by vector (S. WP, K. Kennedy, and C. WP "Compiler WP for Fortran D on WP Distributed-Memory Machines," in Proc. WP '91 pp.86–100, November 1991.) are important in reducing the communications overheads. An overlap area is a special type of buffer area for receiving vector data, and is assigned such that it encompasses a local data area (local area) to be used in computing data internally. The data value of the overlap area is determined by the adjacent processor.

FIG. 1 shows the program code (Jacobi code) of the Jacobi relaxation written in high performance Fortran (HPF). In the Jacobi code shown in FIG. 1, the values of element a (i, j) of the two-dimensional array A are updated using the values of four adjacent elements a (i, j+i), a(i, j−1), a(i+1, j), and a(i−1,j). The size of the array a is specified by a (256, 256). The elements where i=1, 256, j=1, 256 are not updated. For example, the element a(2:255) in the DO loop of the update of data is an array description of Fortran 90, and the number of times of occurrences of the DO loop is t times. This code refers to a typical example of the update of data using an overlap area.

FIG. 2 shows an example of the overlap area in which the Jacobi code shown in FIG. 1 is executed. According to the data distribution specified in the program shown in FIG. 20, the elements in the array a (256, 256) are distributed into the local areas of 16 processors P (x, y) (x=1, 2, 3, 5, y=1, 2, 3, 4) and stored therein. For example, the processor p (2, 2) controls the range of a (65:128, 65:128) in the array a. In FIG. 2, the shadowed portion around the local area of the processor p(2, 2) indicates the overlap area at p(2, 2).

The processor p(2, 2) has a considerably large area of a(64:129, 64:129) including an overlap area so that, when a(i, j) is calculated, the adjacent a(i, j+1), a(i, j−1), a(i+1, j), and a(i−1, j) can be locally accessed.

Without an overlap area, data should be read from adjacent processors in the DO loop and a small volume of data are frequently communicated, resulting in a large communications overheads. However, having an overlap area allows the latest data to be copied to the overlap area by collectively transferring data before an updating process. Therefore, data can be locally updated and the communications overheads can be considerably reduced.

Thus, the overlap area can be explicitly specified by VPP Fortran ("Realization and Evaluation of VPP Fortran Process System for AP1000" Vol. 93-HPC-48-2, pp. 9–16, August 1993 published at SWOPP Tomonoura '93 HPC Conference by Tatsuya Sindoh, Hidetoshi Iwashita, Doi, and Jun-ichi Ogiwara). A certain compiler automatically generates an overlap area as a form of the optimization.

The data transmission patterns for performing parallel processes can be classified into two types. One is a single direction data transfer SDDT, and the other is a bi-directional data transfer BDDT. FIG. 3 shows an example of the SDDT, and FIG. 4 shows an example of the BDDT.

In FIGS. 3 and 4, processors i−1, i, i+1, and i+2 are arranged in a specified dimension and forms a processor array. The SDDT is a transfer method in which all transfer data are transferred in a single direction from the processor i toward the processor i+1 with time in the specified dimension. The BDDT is a transfer method in which data is transferred between adjacent processors in two directions. Thus, some pieces of data are transmitted from the processor i to the processor i+1 while other pieces of data are transmitted from the processor i+1 to the processor i.

FIG. 5 shows the program code of the Jacobi relaxation for a one-dimensional array. In the Jacobi code shown in FIG. 5, the value of the element a(i) of the one-dimensional array a is updated by the output of a function f obtained by inputting to the function f the two adjacent elements a(i−1) and a(i +1). The size of the array a is specified by a(28), and a(1) and a(28) are not updated. The data is updated repeatedly for the time specified by time.

FIG. 6 shows an example in which data is updated using the conventional overlap area when a program shown in FIG. 5 is executed. In FIG. 6, PE0, PE1, PE2, and PE3 are four PEs for dividing and managing the array a. Each PE has an area for storing 9 array elements. A dirty overlap area stores old data and a clean overlap area stores the same latest data as the adjacent PE. A local area stores data to be processed by each PE.

The word "INIT" indicates an initial state and "Update" indicates the data communications between adjacent PEs to update the overlap area. Iter 1, 2, 3, and 4 indicate parallel processes for the update of data at each iteration of the DO loop. In FIG. 6, the overlap area is updated by the BDDT for each iteration.

However, the data update method using the conventional overlap area has the following problems.

Each processor forming part of the parallel processor should update the data in the overlap area into the latest value before making a calculation using the data value of the overlap area. The update process is performed by reading the latest value from the adjacent processor through the communications between processors. In parallel processors, the overheads are heavy for a rise time. Therefore, the time required for the communications process depends on the number of times of data transfers rather than the amount of transferred data. If an overlap area is updated each time a calculation is made using the overlap area, then each communications rise time is accompanied by overheads.

In a parallel processor connected through a torus network such as an AP1000 ("An Architecture of Highly Parallel Computer AP1000," by H. Ishihata, T. Horie, T. Shimizu, and S. Kato, in Proc. IEEE Pacific Rim Conf. on Communications, Computers, and Signal Processing, pp. 13–16, May 1991), the SDDT excels to the BDDT in characteristic because the SDDT can reduce the time of data transfers and the overheads required in a synchronization process between adjacent processors more than the BDDT. However, in the conventional data update process as shown in FIG. 6, the data in the overlap areas should be exchanged between adjacent processors, and the data transfer pattern is based on the BDDT. In the BDDT, each processor should perform communications in synchronism with adjacent processors. As a result, the time of data transfers increases and the overheads for the synchronization processes become heavier than the SDDT.

SUMMARY OF THE INVENTION

The present invention aims at updating data with the overheads for the communications between PEs reduced in the distributed-memory parallel processors, and providing a program converting device for generating a data updating program.

The program converting device according to the present invention is provided in an information processing device, and converts an input program into the program for a parallel processor. The program converting device is provided with a detecting unit, setting unit, size determining unit, and a communications change unit.

The detecting unit detects a portion including the description of the loop where optimization can be realized using an overlap area in the input program. The setting unit assigns an overlap area to the memory of the PE for processing the program at the description of the loop, generates a program code for calculating the data in the area, and then adds it to the initial program. Thus, each PE updates the data in the local area managed by the PE, and also updates the data in the overlap area managed by other PEs at the runtime of the program converted by the parallel processor. The overlap area updated by the closed calculation in each PE requires no data transfer for update, thereby improving the efficiency in parallel process.

The size determining unit estimate the runtime for the description of the loop and determines the optimum size of the overlap area. Normally, the larger the overlap area is, the smaller number of times the data is transferred while the longer time is taken for updating the data in the area. If the size of an overlap area is fixed such that the runtime is the shortest possible, the data update process can be efficiently performed.

The communications change unit checks the data dependency at the detected portion of the description of the loop. If the data is dependent bi-directionally, the description should be rewritten such that the data is dependent in a single direction, and subscripts are generated in the arrangement optimum for data transfer. Thus, each PE only has to communicate with the adjacent PE corresponding to either upper limit or lower limit of the subscripts in the array, thereby successfully, reducing the overheads of the communications.

Thus, the overlap area has been updated using the data transferred externally. However, it is updated in a calculation process in each PE, thereby reducing the overheads for the communications and performing the parallel process at a high speed.

BRIEF DESCRIPTION OF THE DRAWINGS

FIG. 1 shows the Jacobi code in the two-dimensional array;

FIG. 5 shows the Jacobi code in a one-dimensional array;

FIG. 12 is an operating flowchart showing the extended overlap area available portion detecting process;

FIG. 17 is an operating flowchart showing the data update setting process through the data transfer in a single direction;

FIG. 18 shows the original program;

FIG. 19 shows the program after converting the calculation space;

FIG. 20 shows the program with uncalculated elements added;

FIG. 21 shows the program after converting indices;

DESCRIPTION OF THE PREFERRED EMBODIMENTS

The embodiments of the present invention is described in detail by referring to the attached drawings.

Figure 7:
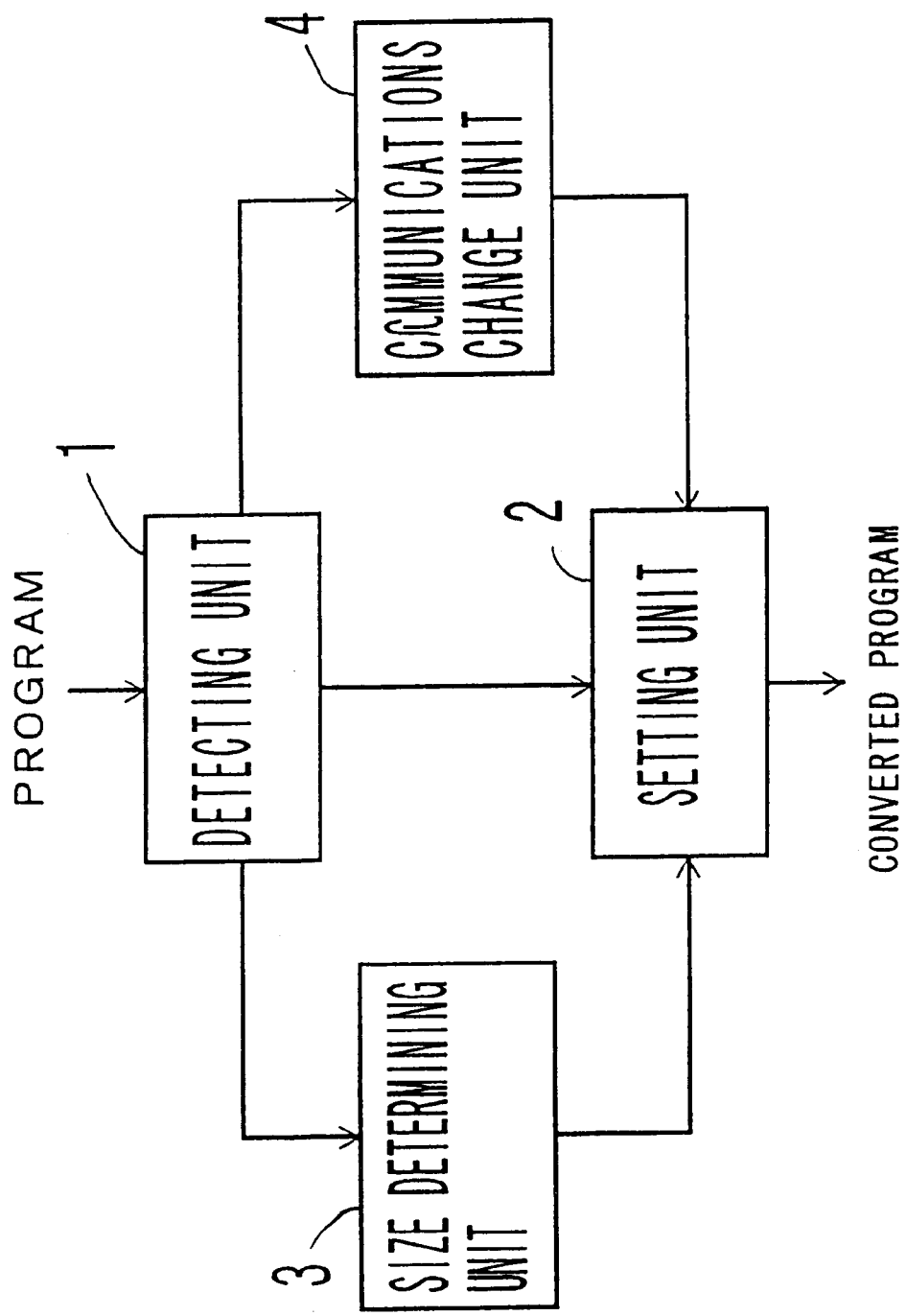
FIG. 7 shows the configuration of the program converting device according to the embodiment of the present invention.

FIG. 7 shows the configuration of the program converting device according to the embodiment of the present invention. The program converting device shown in FIG. 7 is provided in an information processing device and converts an input program into a program for a parallel processor comprising a plurality of PEs and a communications network. The program converting device comprises a detecting unit 1, a setting unit 2, a size determining unit 3, and communications change unit 4.

The detecting unit 1 detects a loop including one to be possibly optimized using an overlap area from the input program.

The setting unit 2 assigns an overlap area to a PE for processing the loop, generates a code for calculating the data in the overlap area, and outputs a converted program.

The size determining unit 3 estimates the runtime for processing the loop, determines the optimum size of the overlap area. The setting unit 2 assigns the overlap area having the size determined by the size determining unit 3 to the PE for processing the loop.

The communications change unit 4 changes the data dependency of the process of the loop from the bi-directional dependency to the uni-directional dependency to generate the subscripts of the array through which data is transferred uni-directionally (SDDT). The setting unit 2 generates a code for updating data through the uni-directional data transfer and adds the generated code to the converted program.

Figure 8:
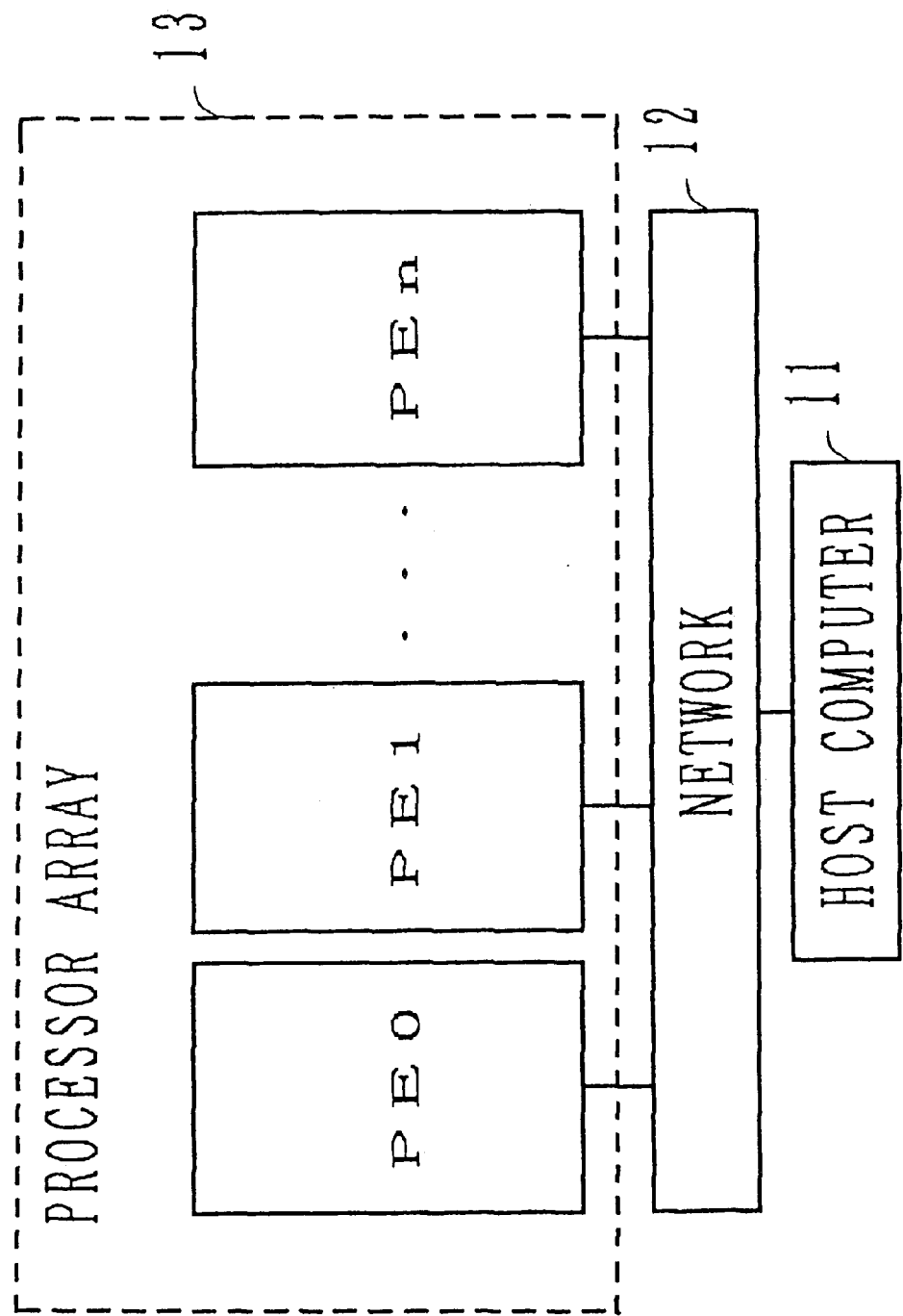
FIG. 8 shows the configuration of the parallel processor according to the embodiment of the present invention.
Figure 9:
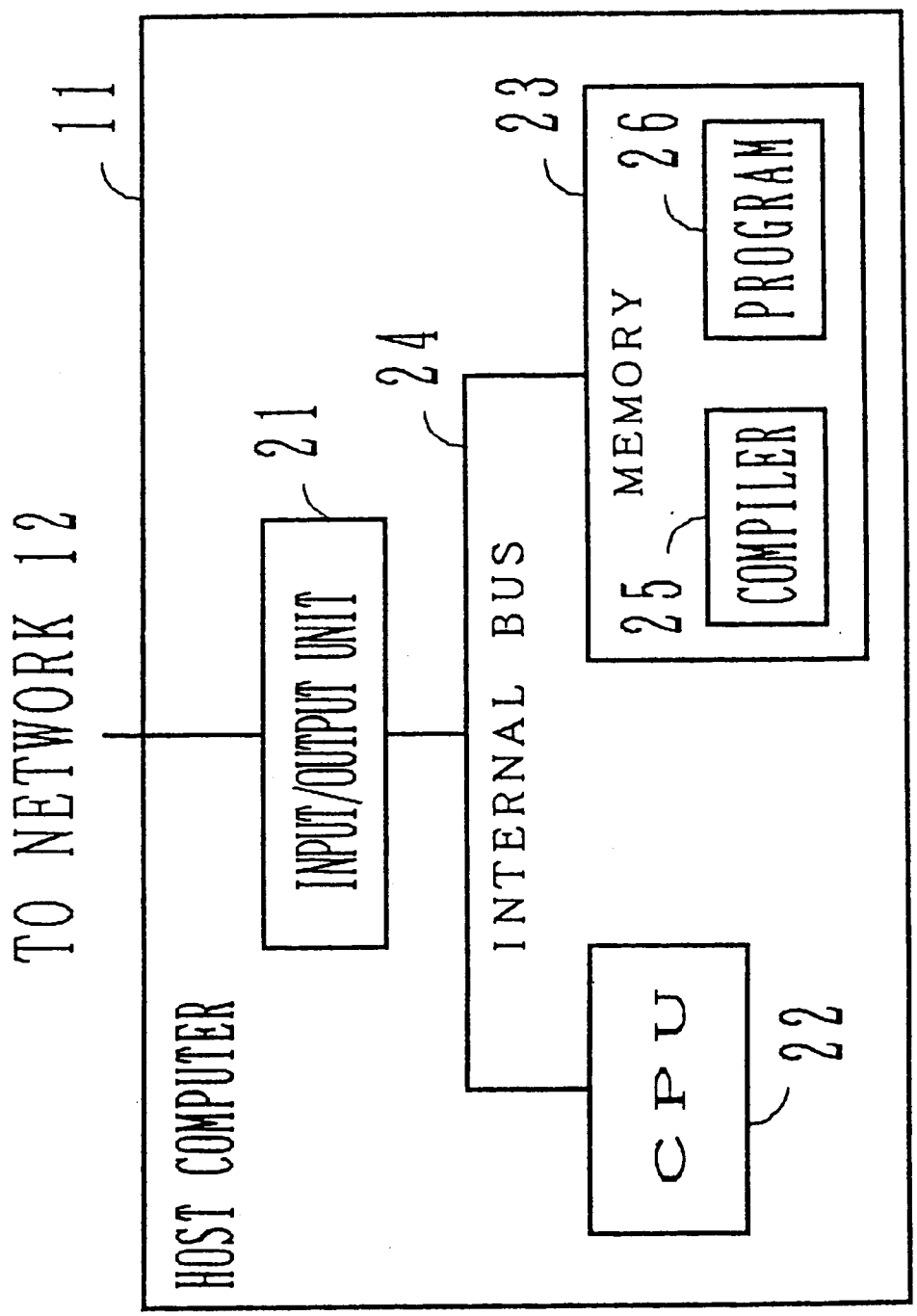
FIG. 9 shows the configuration of the host computer.

The detecting unit 1, setting unit 2, size determining unit 3, and communications change unit 4 shown in FIG. 7 correspond to a host computer 11 shown in FIGS. 8 and 9, and more specifically to each function of a compiler 25 shown in FIG. 9. The compiler 25 is activated by a central processing unit (CPU) 22.

The detecting unit 1 scans an input program and detects a loop to which an overlap area can be applied. For example, the portion where a calculation process capable of performing a parallel process by a plurality of PEs is encompassed by the serial DO loop is detected as shown in FIGS. 1 and 5.

The setting unit 2 assigns an overlap area to each PE for sharing the process for the detected loop, and generates a code for calculating and updating the data in the overlap area. Thus, at the runtime of a converted program, each PE locally calculates the data in the overlap area as well as the data in the local area. Therefore, the time of communications in which data in the overlap area is updated can be reduced, thereby also reducing the communications overheads.

The size determining unit 3 estimates the runtime for processing the loop, and determines, for example, the minimal size of the overlap area. If the overlap area of the optimum size is assigned to each PE, the throughput of the parallel processor can be considerably improved.

The setting unit 2 generates a code for updating data through the SDDT, not through the BDDT. As a result, each PE does not have to communicate with both adjacent PEs at the upper limit and lower limit of the subscript in the array. Therefore, the synchronizing process is not required for the PE not to communicate with, and saving the overheads for the synchronization.

The communications change unit 4 checks the data-dependent vector in the array data used in the above described loop, converts the data into uni-directional transfer from bi-directional transfer, and generates a subscript in the array to perform the SDDT. The setting unit 2 generates a code for updating data using the subscripts in the converted array.

Thus, a program for use in a parallel processor is generated by the program converting device shown in FIG. 7. As a result, the overheads for the communications can be reduced.

FIG. 8 shows the configuration of the parallel processor for realizing the present invention. The parallel processor shown in FIG. 8 comprises the host computer 11, a network 12, and a processor array 13 comprising a plurality of PEs (PE0, PE1, . . . PEn). The host computer 11 controls the entire parallel processor and performs input and output processes. The processor array 13 performs a parallel process. The host computer 11 is connected to each PE through the network 12.

FIG. 9 shows the configuration of the host computer 11. The host computer 11 shown in FIG. 9 comprises an input/output unit 21, the CPU 22, and a memory 23. These units are connected via an internal bus 24. In the host computer 11, the CPU 22 converts (compiles) a single program 26 into a program to be executed in parallel by each PE using the compiler 25 stored in the memory 23. The compiled program code is downloaded to each PE through the input/output unit 21 and is executed by each PE. The network 12 is used in downloading a program code or transferring data between processors at runtime.

Two methods are used for the embodiments of the present invention. One is to use an extended overlap area, and the other is to update data through the SDDT of the overlap area.

An extended overlap area is described by referring to FIGS. 10 through 15.

An extended overlap area is a data storage area which is multiple of common overlap areas. Using an extended overlap area reduces the total number of times of the communications performed to update the overlap area when a process effectively using the overlap area is repeated for plural times in a loop of the loops performed in parallel in a program. In the program according to the Jacobi relaxation shown in FIG. 1, data can be updated for e times after a data transfer if the width of the overlap area shown in FIG. 20 is extended e times.

Figure 6:
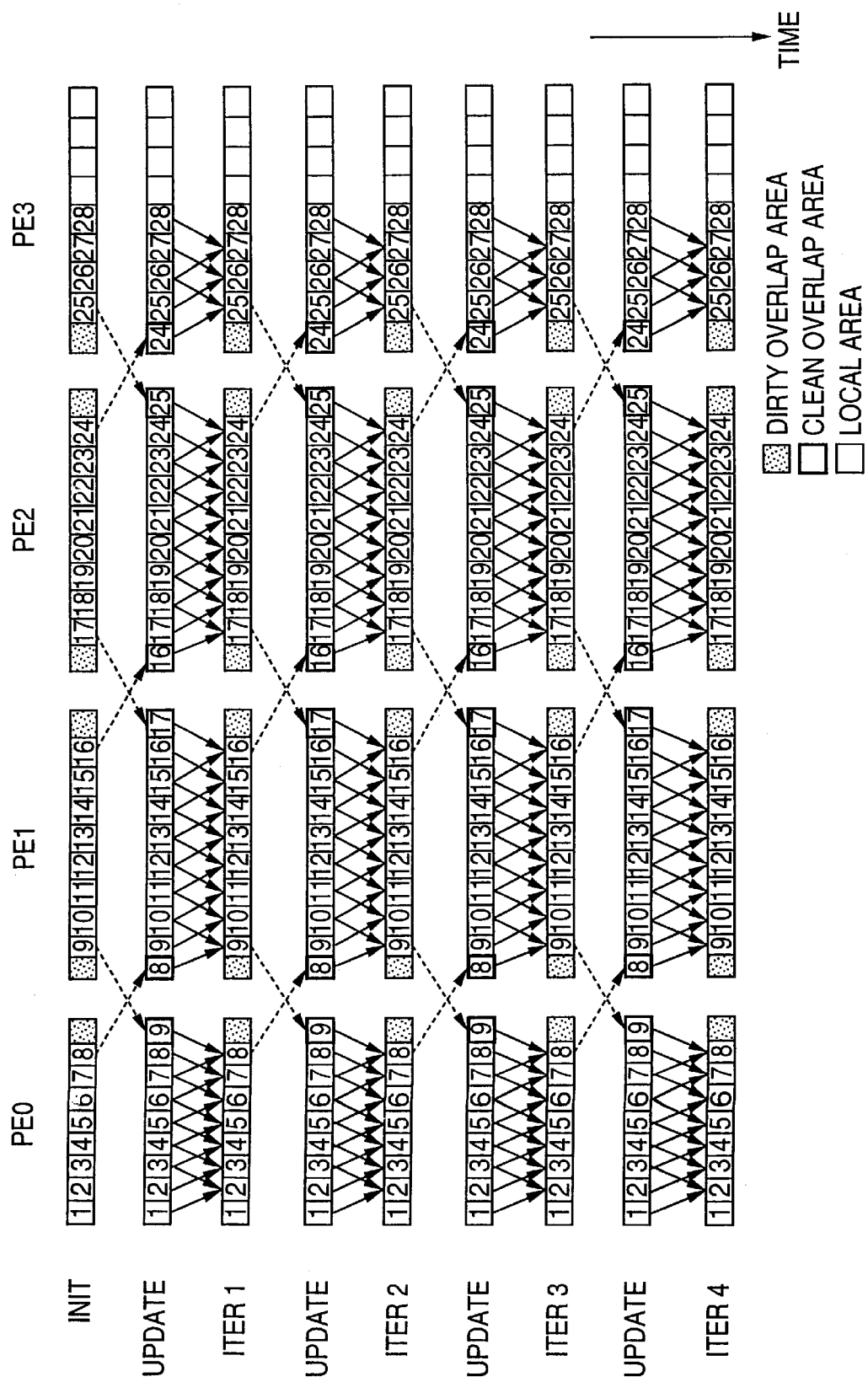
FIG. 6 shows the update of data using the conventional overlap area.
Figure 10:
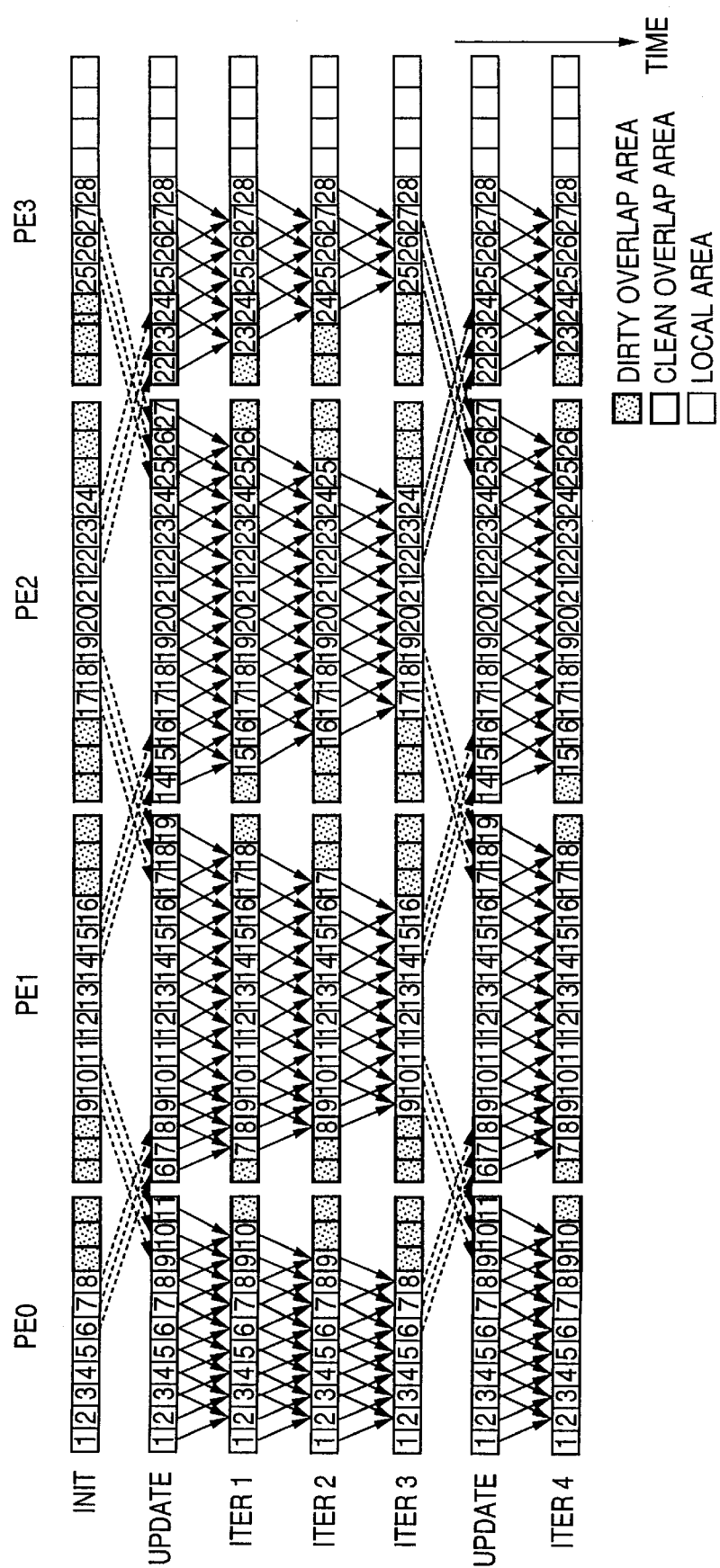
FIG. 10 shows the update of data using an extended overlap area.

FIG. 10 shows the update of data when the Jacobi codes shown in FIG. 5 are executed using the extended overlap area. In FIG. 10, the conventional overlap areas of P0, P1, P2, and P3 shown in FIG. 6 are three times extended. These PEs perform parallel processes using the extended overlap area. The meanings of the dirty overlap area, clean overlap area, local area, INIT, Update, and Iter 1, 2, 3, and 4 are the same as those in FIG. 6. By locally calculating a part of the data in the extended overlap area shown in FIG. 10, data can be transferred only once each time the data is updated three times.

For example, PE1 updates the elements in the range of a(9:16) of the array a, holds the elements in the local area, and contains the storage area as an extended overlap area for the elements in the range of a(6:8) and a(17:19) (INIT). PE1 first establishes communications between PE0 and PE2 and updates the data in the extended overlap area as the latest data (Update).

Then, the first calculation is made using the data in the range of a(6:19) to update the data a (9:16) in the local area and the data a (7:8) and a(17:18) in the extended overlap area (Iter 1). Then, the second calculation is made using the data in the range of a(7:18) to update the data a (9:16) in the local area and the data a (8) and a(17) in the extended overlap area (Iter 2). Then, the second calculation is made using the data in the range of a(8:17) to update only the data a (9:16) (Iter 3).

Since all data in the extended overlap area are dirty, that is, unavailable, PE1 establishes communications again with the adjacent PE to update the extended overlap area and similarly repeats the data updating process of and after Iter 4.

In FIG. 10, each element a(i) before the update of data and each element a(i) after the update of data are stored in physically different memory areas. That is, in each PE, the local area and extended overlap area are both provided with data before the update and data after the update. However, the memory area is automatically segmented at the compilation of the program 26.

When the conventional overlap area is compared with the extended overlap area of the present invention, the total quantity of data transferred for the update of the overlap area remains the same. Since the communications overhead time depends more seriously on the time of transfer than the total quantity of the transferred data, the communications overheads can be more efficiently reduced by using the extended overlap.

Since each PE should make a calculation on a part of the extended overlap area referred to by the subsequent iteration, the calculation and process for the present PE are the same as those for the update of data in the adjacent PE. Therefore, the larger the size of the extended overlap area is, the more heavily the parallelism of the processes is impaired. As an extreme example, if an extended overlap area is set such that a single PE stores the data for all PEs, no communications are required with no parallelism obtained, though. To determine the optimum size of the extended overlap area, the communications overheads and the process parallelism should be traded off.

Figure 11:
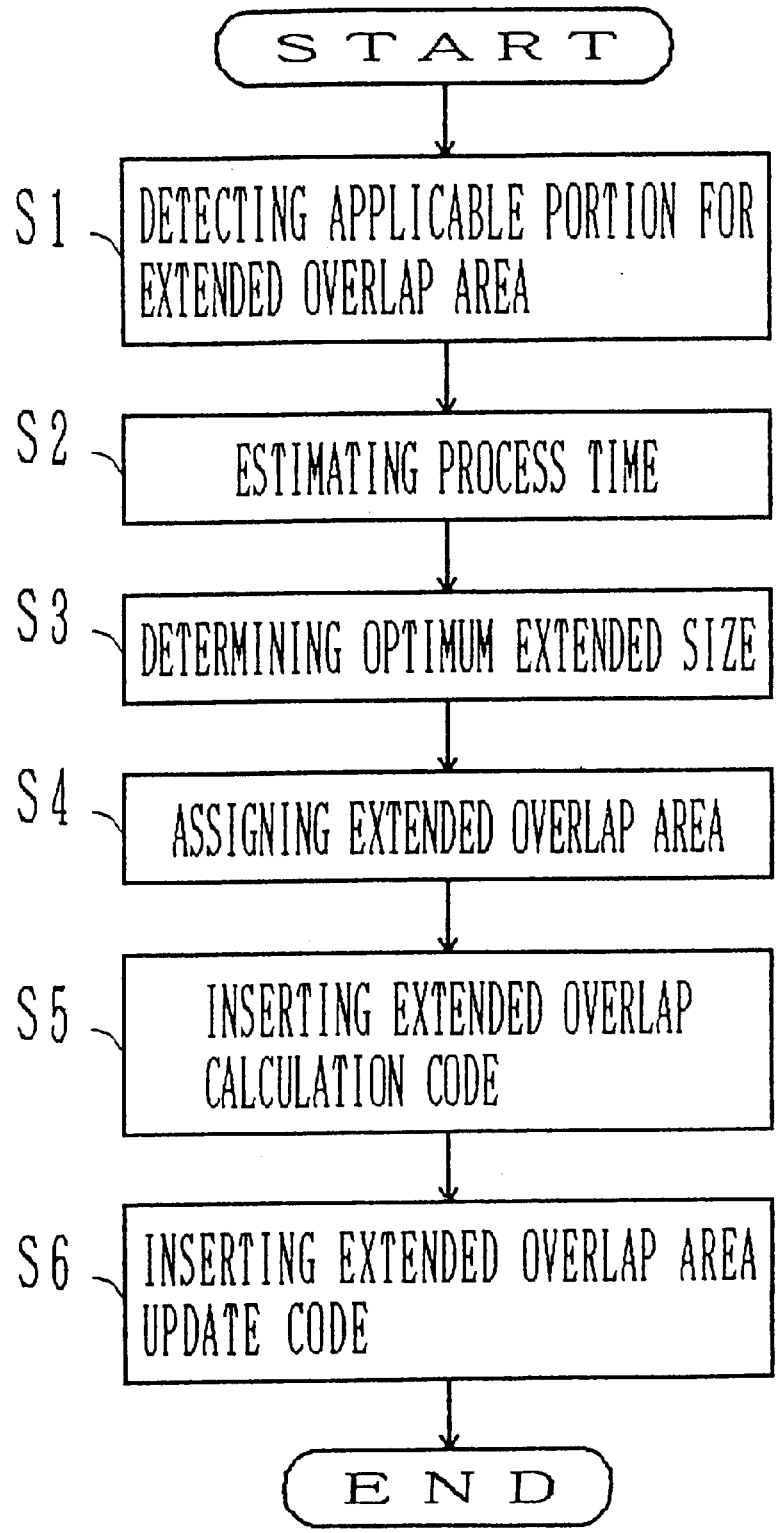
FIG. 11 is an operating flowchart showing the extended overlap area setting process.

FIG. 11 is an operating flowchart showing the extended overlap area setting process performed by the host computer 11 to realize the extended overlap area. The extended overlap area setting process shown in FIG. 11 is performed as a part of the optimizing process by the compiler 25. The input of the optimizing process refers to an instruction (directive) to start the program 26 (serial program) and the process, while the output refers to a program to be executed by each PE. After the program 26 is converted in the optimizing process into the program for each PE, the program and necessary data is downloaded to each PE to perform a parallel process.

If a process starts according to FIG. 11, the host computer 11 detects an applicable point for the extended overlap area contained in the program 26 (step S1). That is, the portion where a parallel loop applicable for the optimization using an overlap area is encompassed by a serial loop is detected as a portion to be effectively processed using the extended overlap area. The parallel loop refers to loop processes which can be processed in parallel by a plurality of PEs as the operations described in lines 6 and 7 shown in FIG. 1. The serial loop refers to loop processes repeatedly performed in series as a DO loop described in lines 5 and 8 shown in FIG. 1.

FIG. 12 is an operating flowchart showing an example of the process in step Sl shown in FIG. 11. When a process starts according to FIG. 12, the host computer 11 selects a DO loop contained in the program 26 (step S1-1) and checks whether or not the process can be performed in parallel (step S1-2). In the case shown in FIG. 1, the parallel loop corresponds to the selected DO loop. If it can be processed in parallel, then it is determined whether or not it is a DO loop applicable effectively using an overlap area (step S1-3). A DO loop effectively applicable using an overlap area refers to a process locally performed by each PE by providing an overlap area. If the overlap area is effective, then it is determined whether or not the DO loop (parallel loop) is tightly encompassed by a serial loop (step S1-4). If the DO loop is tightly encompassed, the selected DO loop is entered in an appropriate area in a memory 23 as an applicable portion for the extended overlap area (step S1-5).

Then, it is checked whether or not any other DO loops exist (step S1-6). If yes, the processes in and after step S1-1 is repeated. If not, the process terminates. If the determination results are "No" in steps S1-2, S1-3, and S1-4, control is passed to the process in step S1-6.

Figure 2:
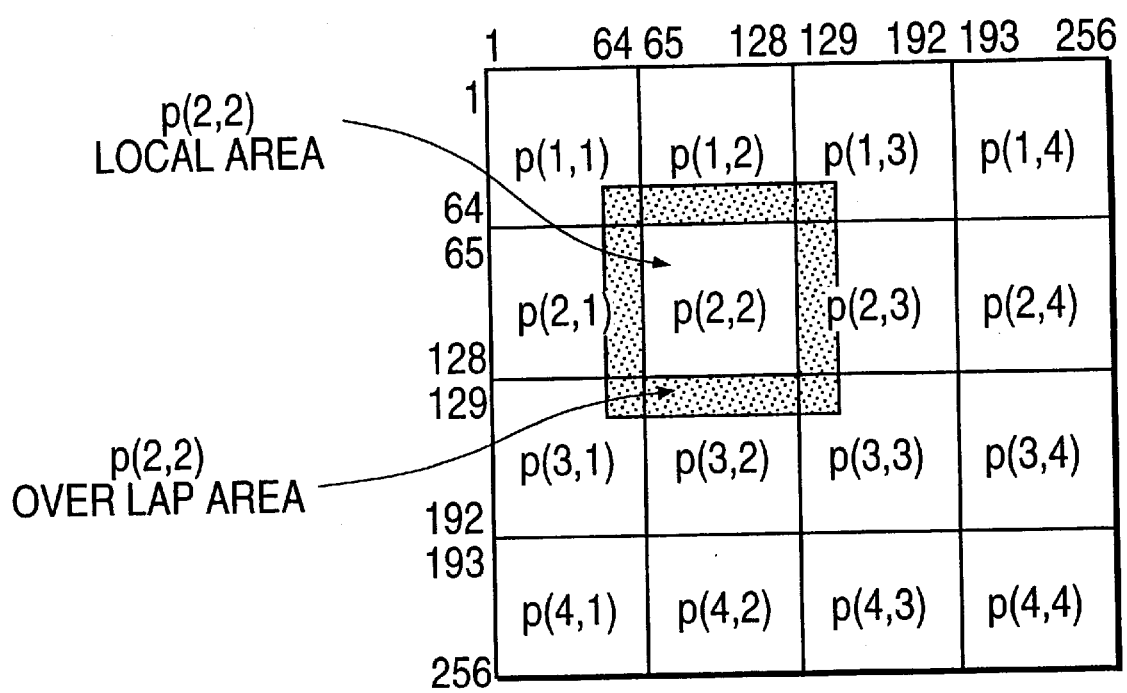
FIG. 2 shows the conventional overlap area.
Figure 3:
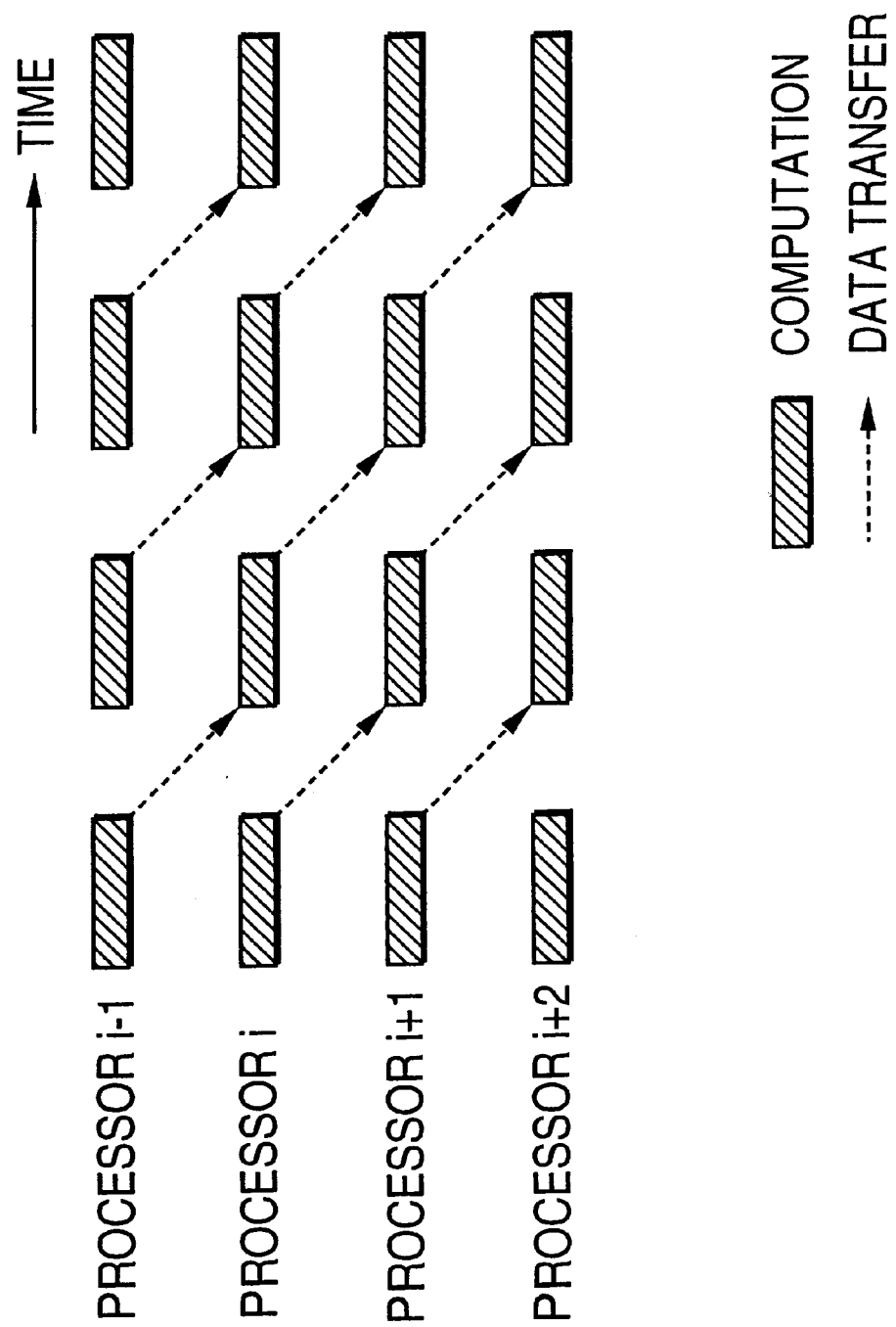
FIG. 3 shows the data transfer in a single direction.
Figure 4:
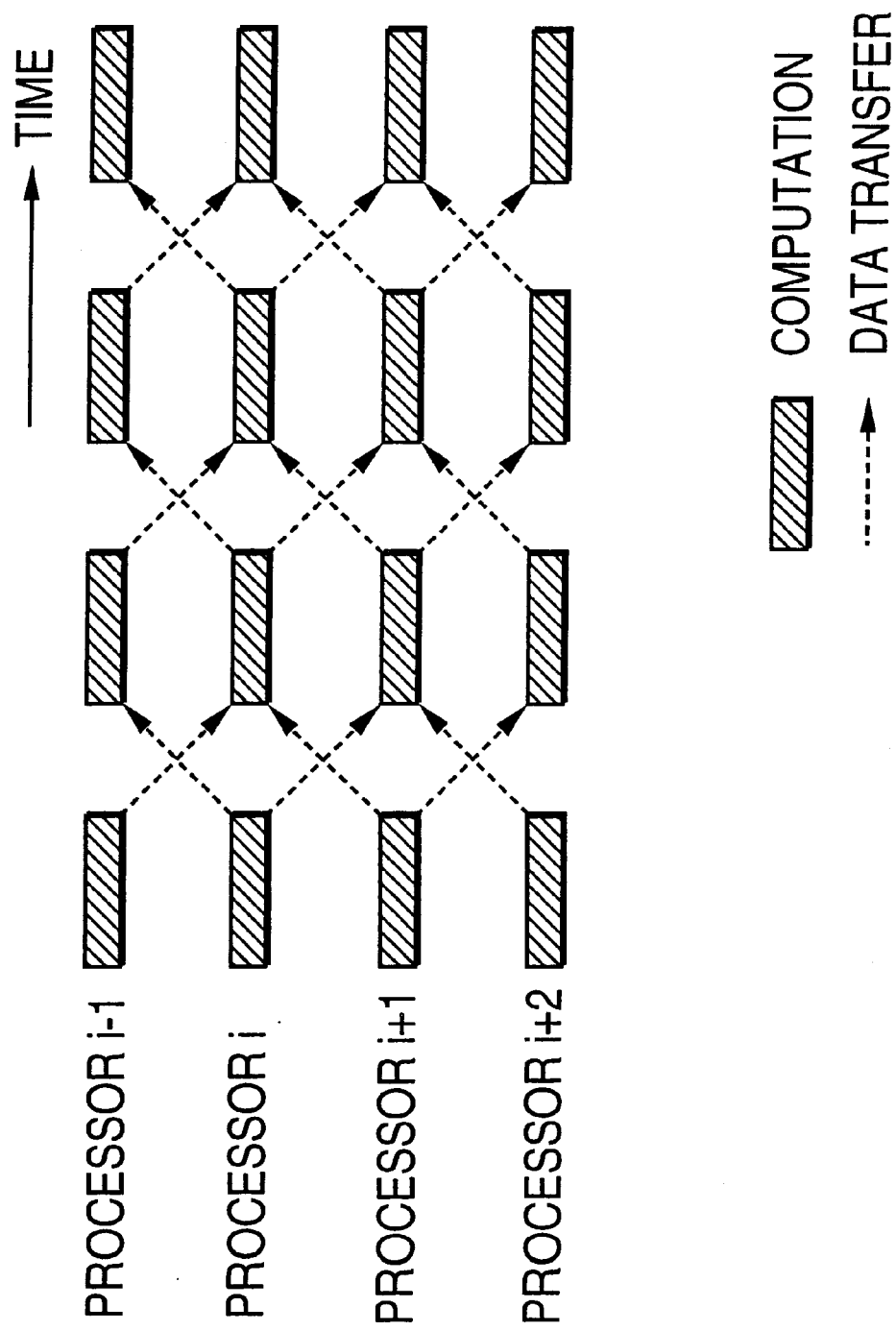
FIG. 4 shows the data transfer in two directions.

As a result of the extended overlap area applicable portion detecting process shown in FIG. 12, for example, the parallel loops shown in FIGS. 1 and 4 are entered as applicable portions.

In FIG. 11, the host computer 11 performs the process in step S1, generates an executable model using the extended overlap area, and estimates the runtime for the program (step S2). Described below is the method of estimating the runtime by referring to an example of the extended overlap area for a common two-dimensional array.

Figure 13:
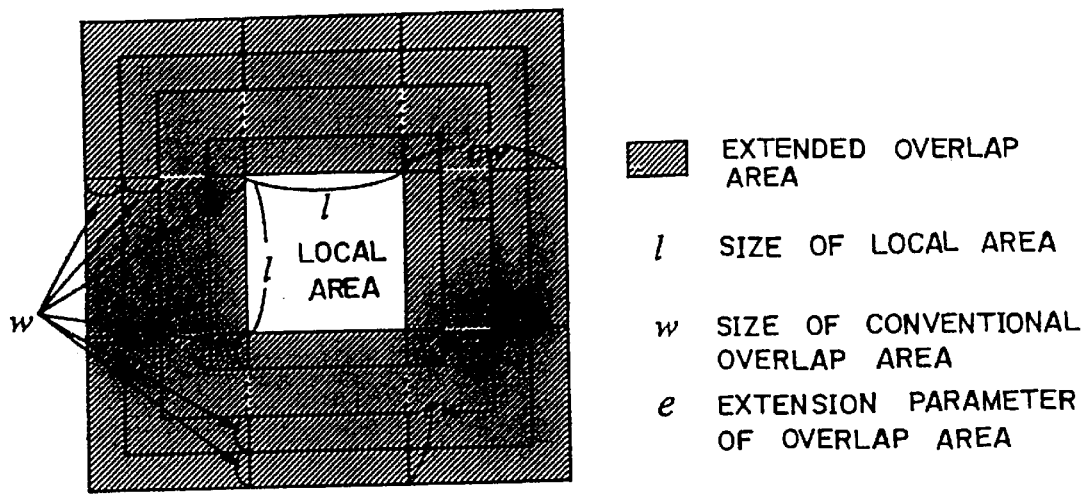
FIG. 13 shows a two-dimensional extended overlap area.

FIG. 13 shows an extended overlap area provided at and around the local area of a PE storing a two-dimensional array. In FIG. 13, 1 shows the size (number of array elements in each dimension) of a local area, w shows the size (width) of the conventional overlap area, e is a parameter showing how much the conventional overlap area is extended, and ew shows the size (width) of the extended overlap area.

Assuming that the calculation time for a unit area (1 element) in a local area or an extended overlap area is a, the overhead time (prologue and epilogue time) taken for the activation and termination of one data transfer process is c, and that the time taken for a data transfer per unit area is d, then the data transfer time is calculated by the equation c+d×size of transferred area.

In the optimization using an extended overlap area, communications are established first for e times of data update (e iteration). The data to be communicated is the extended overlap area shown as a shadowed portion in FIG. 13. The area (number of elements) of this portion is 4ew(ew+1). The communications are established 8 times between the eight PEs processing array elements in the upper, lower, right, left, and in four diagonal directions. Therefore, the total communications time required for the e iteration is calculated by the following equation:

$$8c+4dew(ew+l) \tag{1}$$

The communications time for an iteration is obtained by dividing equation (1) by e as follows.

$$\frac{8c + 4dew\ (ew + l)}{e} \tag{2}$$

Then, the time taken for the calculation for the update of data is estimated. Since the number of calculation elements in the local area is $1^2$, the calculation time required for e iteration of the calculation for the local area is $ael^2$. If the size (width) of the updated area in the extended overlap area is kw in each iteration, the number of calculation elements in the extended overlap area is 4 kw(kw+1), where k is a parameter representing how many times of the conventional overlap area the update portion is in the extended overlap area in each iteration. If data is locally updated without communications, the extended overlap area sequentially becomes dirty from outside to inside for each iteration, the width of the updated portion in the extended overlap area decreases by w each time. Accordingly, the calculation time taken for calculating the extended overlap area during the e iteration is obtained by the following equation;

$$4a\sum_{k=1}^{e-1} kw(kw+l) \tag{3}$$

Since the calculation time taken for calculating the extended overlap area at the e-k-th iteration is 4 akw(kw+1), the sum of k from 1 to e-1 is calculated by equation (3). The calculation time for an iteration is obtained by adding the calculation time for the local area for e iterations to the calculation time for the extended overlap area and then by dividing the sum by e as follows.

$$4a \sum_{k=1}^{e-1} kw(kw + l) + ael^2 \over e \quad (4)$$

According to equations (2) and (4), the runtime $T_{ier}$ (e) for one serial loop using the extended overlap area is represented as a function of e as follows.

$$T_{iter}(e) = {8c + 4dew(ew + l) \over e} + {4a \sum_{k=1}^{e-1} kw(kw + l) + ael^2 \over e} = \quad (5)$$

$${8c \over e} + (4dw^2 - 2w^2 a + 2alw)e +$$

$${4w^2 a \over 3}e^2 + \left(4dlw^2 + al^2 + {2 \over 3}w^2 a - 2alw\right)$$

If the calculation time is estimated, the host computer 11 determines the optimum size of the extended overlap area according to the estimate result (step S3). The optimum size of the extended overlap area refers to the size f or the shortest possible runtime.

For example, assuming that, in equation (5), the coefficient of the term of $e^2$ is s, the coefficient of the term of e is t, the coefficient of the term of 1/e is u, and the term O is V for e, then equation (5) is rewritten as follows.

$$T_{iter}(e) = se^2 + te + u/e + v \quad (6)$$

Figure 14:
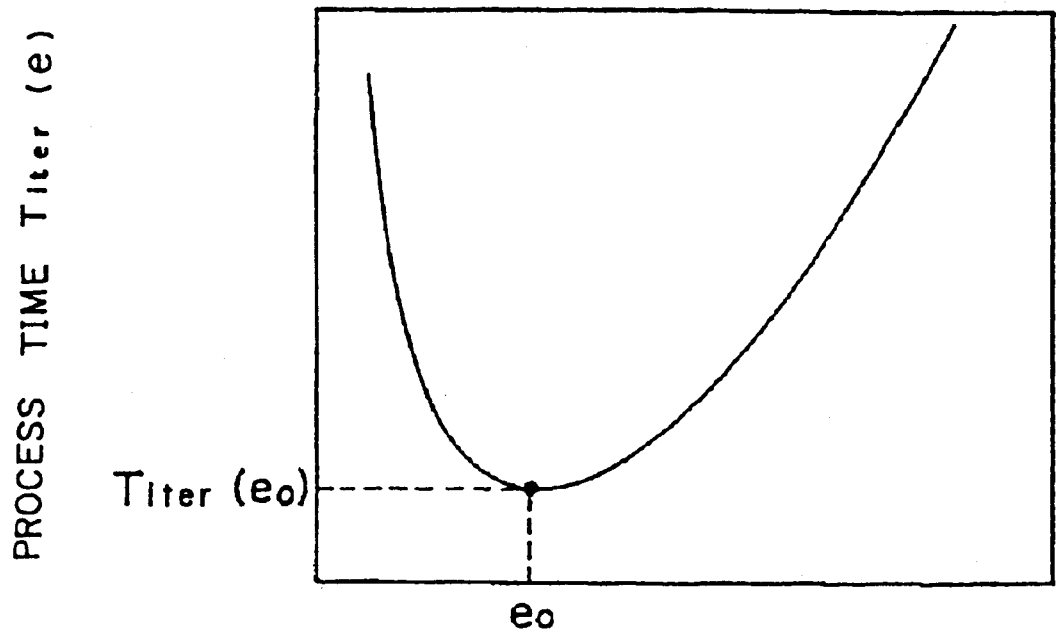
FIG. 14 shows the relationship between the extended parameter and the runtime.

FIG. 14 is the graph showing the relationship between $T_{iter}$ (e) and e in equation (6). The value $e_0$ for e corresponding to the minimum value $T_{iter}$ ($e_0$) for $T_{iter}$ (e) shown in FIG. 14 can be obtained by solving the following equation for e.

$${dT_{iter}(e) \over de} = 0 \quad (7)$$

The obtained $e_0$ is a value of the extension parameter for optimizing the size of the extended overlap area. The size of the extended overlap area is provided by the $e_0$w.

If the optimum size of the extended overlap area is determined, the host computer 11 assigns the extended overlap area of the size to each PE (step S4).

Figure 15:
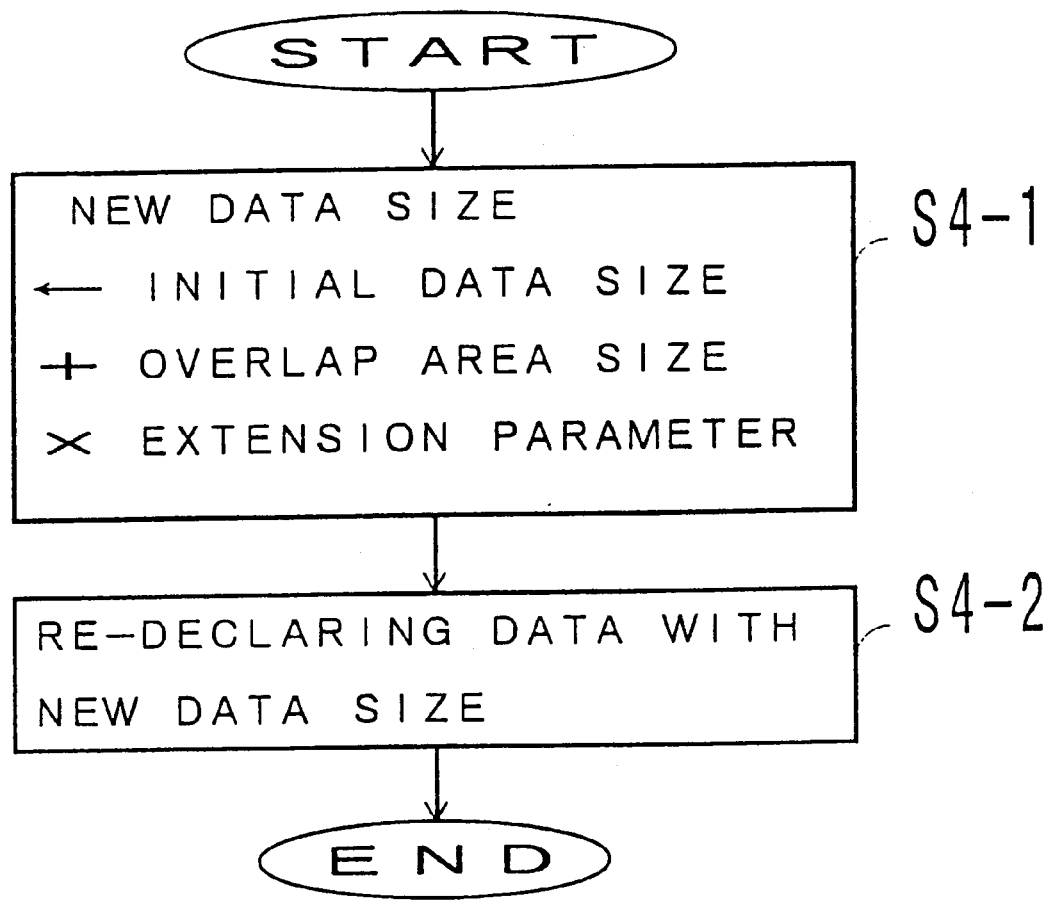
FIG. 15 is an operating flowchart showing the extended overlap area assigning process.

FIG. 15 is an operating flowchart showing an example of the extended overlap area assigning process performed in step S4 shown in FIG. 11. When the process starts according to FIG. 15, the host computer 11 first adds the optimum size of the extended overlap area to the data size (original data size) of the local area of each PE as a new data size (step S4-1). The optimum size of the extended overlap area is obtained as a product of the optimum extension parameter obtained in step S3 by the width of the conventional overlap area. According to the example shown in FIG. 13, the optimum size is $e_0$w. Then, the data is declared again with the new data size (step S4-2), and the process terminates.

Thus, the extended overlap area of each PE is assigned the data, of the size of the extended overlap area, of the local area for another PE.

If the process in step S4 is completed, the host computer 11 inserts a program code for use in calculating an extended overlap area (step S5). Thus, a code is generated such that the range of the process of each PE in a parallel loop can be extended by the size of the extended overlap area. The generated code is put into the program.

For example, the range of the indices in an array managed by the PE1 shown in FIG. 10 is originally 9–16. If a code is generated for the range 7–18 in Iter 1, new values of indices 7, 8, 17, and 18 are obtained from the values in the extended overlap area. Likewise, the calculation for the range 8–17 in Iter 2 can be made. Thus, the new values for the indices 8 and 17 can be obtained using the values in the extended overlap area obtained in Iter 1.

Then, a program code is inserted to update the extended overlap area (step S6). In this process, a code is generated such that communications are established each time a serial loop encompassing a parallel loop is repeated for the times indicated by the extension parameter to update the data in the extended overlap area. Then, the code is put into the program of each PE.

For example, communications are established for each iteration of three serial loops in the example shown in FIG. 10. In the example shown in FIG. 13, communications are established for each iteration of eo serial loops. After step S6, the host computer 11 terminates the process.

The update by the SDDT of the overlap area is described below by referring to FIGS. 16 through 23. Even if the overlap areas are provided on both sides of the local area as shown in FIG. 6, the communications can be converted into the uni-directional communications by shifting the data layout into the communications direction between the PEs each time the data is updated.

Figure 16:
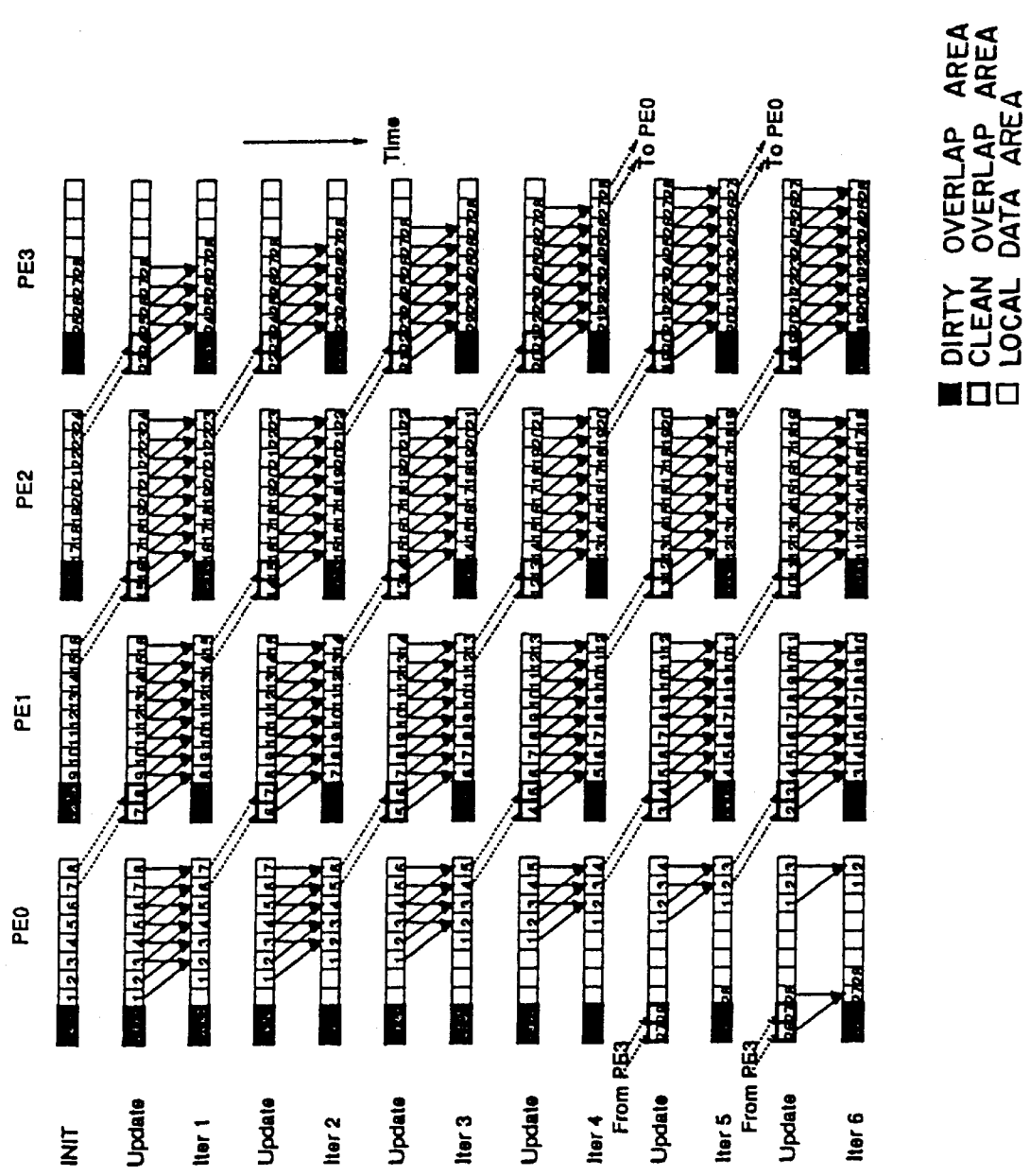
FIG. 16 shows the update of data through the data transfer in a single direction.

FIG. 16 shows an example of updating data by the SDDT when the program shown in FIG. 5 is executed. In FIG. 16, the meanings of the dirty overlap area, clean overlap area, local area, INIT, Update, and Iter 1, 2, 3, . . . are the same as those shown in FIG. 6.

The storage position of the data is shifted for each iteration into one direction in a torus form in the system using the SDDT. To convert the conventional system in which an overlap area is updated by the BDDT into the system using the SDDT, the data required to obtain a new value is sent to the adjacent PE for one direction of the two-directional communications instead of receiving the data required to calculate the new value from the adjacent PE. As a result, the communications are established uni-directionally and the overlap area can be provided for only one side of the local area.

For example, at the initial state, PE1 holds the elements in the range of a (9:16) in the array a, and has the storage area for the elements in the range of a (7:8) as an overlap area (INIT). Then, the PE1 receives the data from the PE0, updates the data in the overlap area, and transmits the data in the range of a (15:16) to the PE2 (Update).

Then, the PE1 makes the first calculation using the data in the range of a (7:16), updates the data in a (8:15) (Iter 1), and stores the data after shifting the storage position in the communications direction by 1. At this time, the data in a (16) initially stored by the PE1 is updated in parallel by the PE2. Since the data in the overlap area have become all dirty, the PE1 established uni-directional communications between the PE1 and the adjacent PE, updates the extended overlap area, and performs the data update process for Iter 2.

Since repeating these processes sequentially shifts the storage positions of all data over the PE0 through PE3 in a torus form, after data update process for Iter 4, the data in a (27:28) of the PE3 is transferred to the overlap area of the PE0.

The result of the data updated by the SDDT shown in FIG. 16 matches the result conventionally updated by the BDDT. Between the BDDT and SDDT, the total volume of transferred data is the same, but the transfer time with the SDDT can be reduced into half the transfer time with the BDDT. Therefore, by using the SDDT, the overheads required to activate the data transfer and the overheads required in the synchronization process between adjacent PEs can be reduced.

FIG. 17 is an operating flowchart showing the setting process in updating the data by the SDDT. The setting process shown in FIG. 17 can be performed by the host computer 11 as a part of the optimizing process by the compiler 25.

When the process starts as shown in FIG. 17, the host computer 11 detects the point of data update by the SDDT contained in the program 26 (step S11). That is, the point where a parallel loop applicable for the optimization using the overlap areas is encompassed by a serial loop and the overlap areas are provided for both sides (at upper and lower limits) of the local area of each PE is detected as a point where the update by the SDDT effectively works.

Then, a computational transformation is made (step S12). In this process, the position of the data calculated according to the count of the outer serial loop is shifted and the SDDT is used in updating the overlap areas.

In the computational transformation, a loop nest for determining a computational space is converted such that all data-dependent vectors can be positive in the direction along the axis of the processor array 13. For the loop where the data-dependency is represented by a distance vector, the computational space conversion can be performed as an application of unimodular transformation (M. E. Wolf and M. S. Lam. "A loop transformation theory and an algorithm to maximize parallelism," in IEEE Transaction on Parallel and Distributed Systems, pp. 452–471, October 1991). In this case, the transform matrix T can be represented as follows with the dimension of the array set to m, and with the parameter of the skew in each dimension set to $a_1, a_2, \ldots, a_m$.

$$T = \begin{bmatrix} 1 & 0 & 0 & \ldots & 0 \\ a_1 & 1 & 0 & \ldots & 0 \\ a_2 & 0 & 1 & \ldots & 0 \\ . & . & . & . & \\ . & . & . & . & 0 \\ . & . & . & . & \\ a_m & 0 & 0 & \ldots & 1 \end{bmatrix} \quad (8)$$

The skew vector S containing the parameters $a_1, a_2, \ldots, a_m$ of equation (8) can be defined as follows.

$$S = \begin{bmatrix} a_1 \\ a_2 \\ \vdots \\ a_m \end{bmatrix} \quad (9)$$

Figure 22:
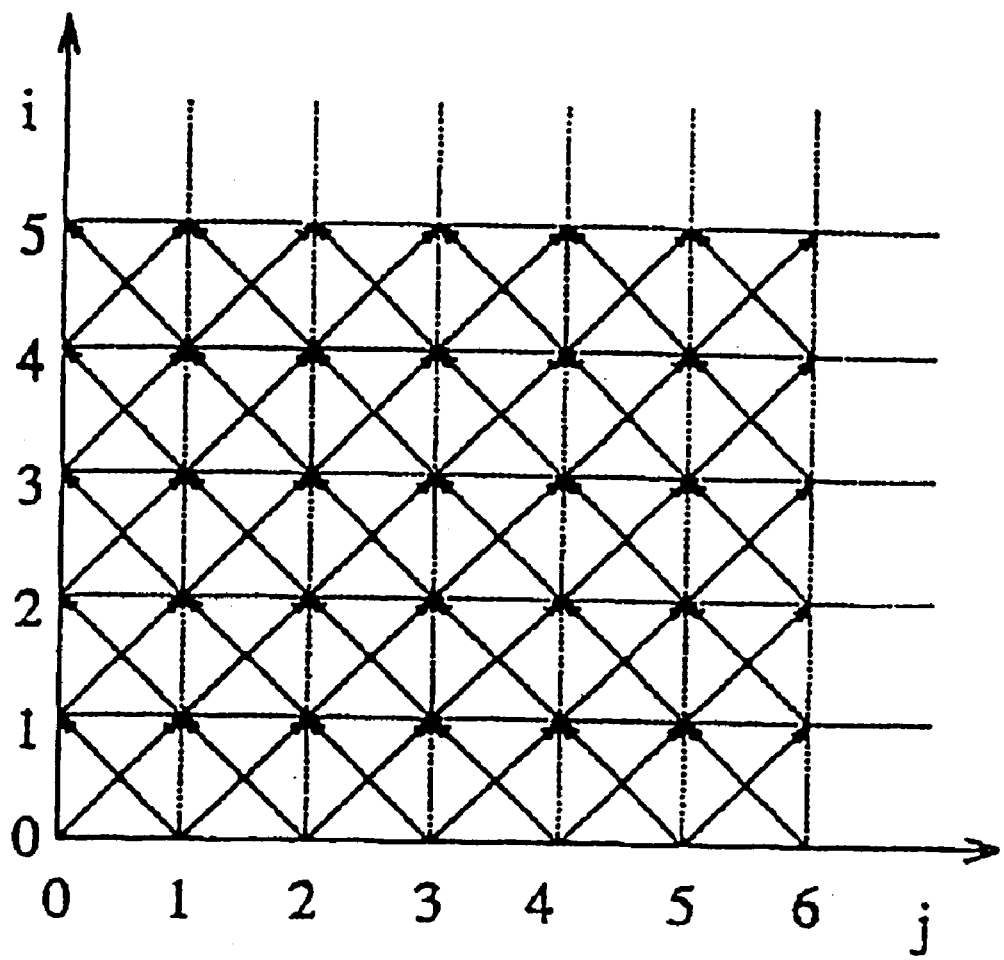
FIG. 22 shows the distance vector for the original program.

FIG. 18 shows the program (original program) rewritten from the parallel loop of the program shown in FIG. 5 in the FORALL syntax. FIG. 22 shows the distance vector (i, j) representing the data-dependency of the original program. In FIG. 22, i indicates a time axis and corresponds to the serial loop repetition parameter, and j indicates a space axis over the PEs and is mapped along the memory space axis corresponding to the PE-connection direction (PE arrangement direction). The "j" corresponds to the parameter of the FORALL syntax shown in FIG. 18.

In the program shown in FIG. 18, the communications for the update of the overlap area is the BDDT because the distance vector is bi-directional over a plurality of PEs if the j axis is mapped in the PE array. When a pair of distance vectors representing the program data dependency is D, the following equation exists.

$$D = \{(1,-1),(1,1)\} \quad (10)$$

Next, a conversion matrix T in which the time axis is removed to make the program loop nest fully permutable is obtained. Since the array is one-dimensional, the conversion matrix T in equation (8) forms a 2×2 matrix (2 rows by 2 columns) and the following equation exists.

$$T = \begin{bmatrix} 1 & 0 \\ a_1 & 1 \end{bmatrix} \quad (11)$$

With T set as shown above, the distance vector (1, −1) and (1, 1) are converted as follows.

$$\begin{bmatrix} 1 & 0 \\ a_1 & 1 \end{bmatrix} \begin{bmatrix} 1 \\ -1 \end{bmatrix} = \begin{bmatrix} 1 \\ a_1 - 1 \end{bmatrix} \quad (12)$$

$$\begin{bmatrix} 1 & 0 \\ a_1 & 1 \end{bmatrix} \begin{bmatrix} 1 \\ 1 \end{bmatrix} = \begin{bmatrix} 1 \\ a_1 + 1 \end{bmatrix} \quad (13)$$

Equation (12) indicates that the distance vector (1, −1) is converted by T into the distance vector (1, $a_1$−1) Equation (13) indicates that the distance vector (1, 1) is converted by T into the distance vector (1, $a_1$+1).

To make the loop nest fully permutable, both components $a_1$−1 and $a_1$+1 of the converted distance vector should be equal to or larger than 0. This condition is represented by the following equation.

$$a_1 \geq 1 \quad (14)$$

The minimum value of $a_1$ satisfying the conditions to make the loop nest permutable is 1. The "T" in equation (11) is represented as follows.

$$T = \begin{bmatrix} 1 & 0 \\ 1 & 1 \end{bmatrix} \quad (15)$$

The converted distance vectors obtained from equations (12) and (13) are (1, 0) and (1, 2) respectively, and the skew vector S (a scalar in this case) is S=$a_1$=1 by equation (9).

Figure 23:
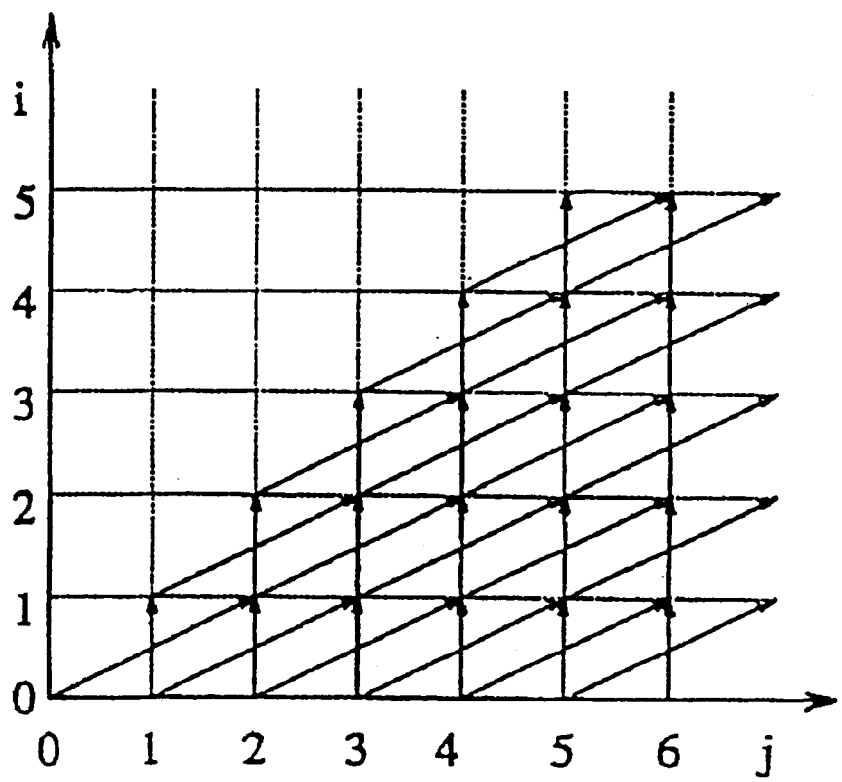
FIG. 23 shows the distance vector after the conversion.

FIG. 23 shows the distance vector obtained by applying the conversion matrix T of equation (15) to the distance vector shown in FIG. 22. In FIG. 23, the component j of all distance vectors is positive, and the data over all PEs depends uni-directionally.

If the "T" in equation (15) is applied to (i, j) of the program shown in FIG. 18, the converted values (i', j') are obtained by the following equation.

$$\begin{bmatrix} i' \\ j' \end{bmatrix} = \begin{bmatrix} 1 & 0 \\ 1 & 1 \end{bmatrix} \begin{bmatrix} i \\ j \end{bmatrix} = \begin{bmatrix} i \\ i+j \end{bmatrix} \quad (16)$$

FIG. 19 shows the program obtained by rewriting the virtual array a of the program shown in FIG. 18 by the paradigm of a shared memory. The actual array corresponding to the virtual array a is distributed over plural PEs and statically assigned a memory area.

When the computational space transform is completed, the host computer 11 performs an index transformation (step S13). In this process, the data layout is shifted according to the changes in data dependency.

With the changes in data dependency, the data layout in the memory space of each PE should be aligned into the mapping for the calculation process. However, it cannot be aligned into the mapping in which the calculation position is shifted with the static data layout declared in the data parallel language such as the HPF, thereby disabling the SDDT. As a result, the relationship between the virtual array and the actual array should be changed with time so that the data alignment to each PE can be shifted for each iteration of the serial loop.

Assuming that the subscript vector of the m-dimensional virtual array is $I_v=(I_{v1}, I_{v2}, \ldots, I_{vm})$ and the subscript vector of the corresponding actual array is $I_p=(I_{p1}, I_{p2}, \ldots, I_{pm})$, the index transform from $I_v$ to $I_p$ is represented as follows.

$$I_p = I_v + tS, \quad I_p = \begin{bmatrix} I_{p1} \\ I_{p2} \\ \vdots \\ I_{pm} \end{bmatrix}, \quad I_v = \begin{bmatrix} I_{v1} \\ I_{v2} \\ \vdots \\ I_{vm} \end{bmatrix} \quad (17)$$

However, the time step t is used for the subscript in the virtual array before update while the time step t+1 is used for the subscript in the virtual array after update. After performing such indexing processes, the storage positions of all elements in an actual array can be sifted in each time step. However, since the elements at the upper and lower limits of the virtual array are not calculated and not updated unless new values are assigned, the storage positions should be shifted with the values of the elements stored. A code is inserted to ensure such consistency before applying the index conversion process.

FIG. 20 shows the program obtained by adding to the program shown in FIG. 19 a code to hold an uncalculated element value. In FIG. 20, the cases where j'=i'−1 and j'=i'+26 correspond to the processes of the element at the upper and lower limit respectively, and a statement is inserted to set these element values constant.

FIG. 21 shows the program obtained by applying the index conversion process to the program shown in FIG. 20. In FIG. 21, A shows an actual array corresponding to the virtual array a. At this time, the conversion of the parameter in the index conversion process is represented as follows.

$$J \leftarrow j'+t \quad (18)$$

$$t \leftarrow i'+1 \text{ for LHS (left side)} \quad (19)$$

$$t \leftarrow i' \text{ for RHS (right side)} \quad (20)$$

where the conversion by equation (18) replaces all j's in the program with J after converting j appearing in the equations shown in FIG. 20 into j'+t. The conversion by equation (19) substitutes i'+1 for t of the left part while the conversion by equation (20) substitutes i' for t of the right part.

According to the latest program shown in FIG. 21, the positions of the elements at both ends corresponding to J=i'−1, i'+26 are shifted by 1 per time step with their values remaining unchanged. Other elements are updated using the values of the adjacent elements in each time step, and the positions are shifted by 1. Thus, the data can be updated using the SDDT as shown in FIG. 16.

After the index conversion process, the host computer 11 inserts a code for use in restoring the data layout (step S14), and terminates the process. To restore data layout refers to a process of returning the storage position of each element shifted in the data update process using the SDDT to the initial position specified by the programmer.

For example, in the data update process shown in FIG. 16, the storage position of the actual array is shifted by 1 to right for each iteration of the serial loop, the position is shifted by $i_f$ to the right of the initial position after $i_f$ iterations. If it is returned to the original position by shifting all elements by $i_f$ to the left after all serial loops are processed, then the influences by the shift can be ignored in the succeeding processes. Such restoration codes are further added to the program shown in FIG. 21.

In FIG. 16, the data transfer time in a single update process on the overlap area can be reduced by using the SDDT. However, since the overlap area is not updated through a calculation, the communications are erected for each iteration of the serial loop to update the overlap area. If the above described extended overlap area is applied to the data update using the SDDT, the overhead required for the communications can be further reduced.

Figure 24:
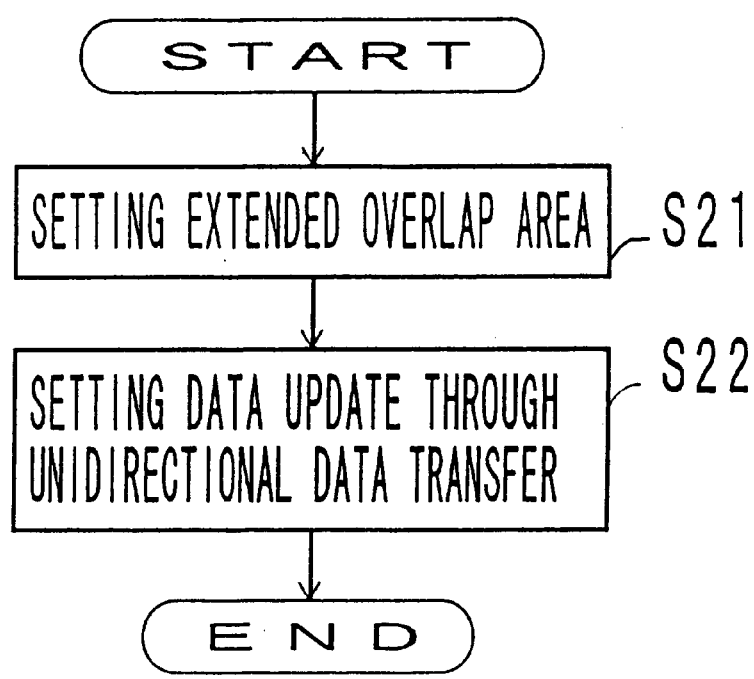
FIG. 24 is an operating flowchart showing the setting process.

FIG. 24 is an operating flowchart showing the setting process in which the extended overlap area is set and data update is set using the SDDT. The setting process shown in FIG. 24 is also performed by the host computer 11 as a part of the optimization process by the compiler 25. When the process starts as shown in FIG. 24, the host computer 11 first performs the extended overlap area setting process (step S21) shown in FIG. 11, then performs the data update setting process (step S22) using the SDDT shown in FIG. 17, and terminates the process. Thus, the program is generated such that the data can be updated using the SDDT in the extended overlap area.

Figure 25:
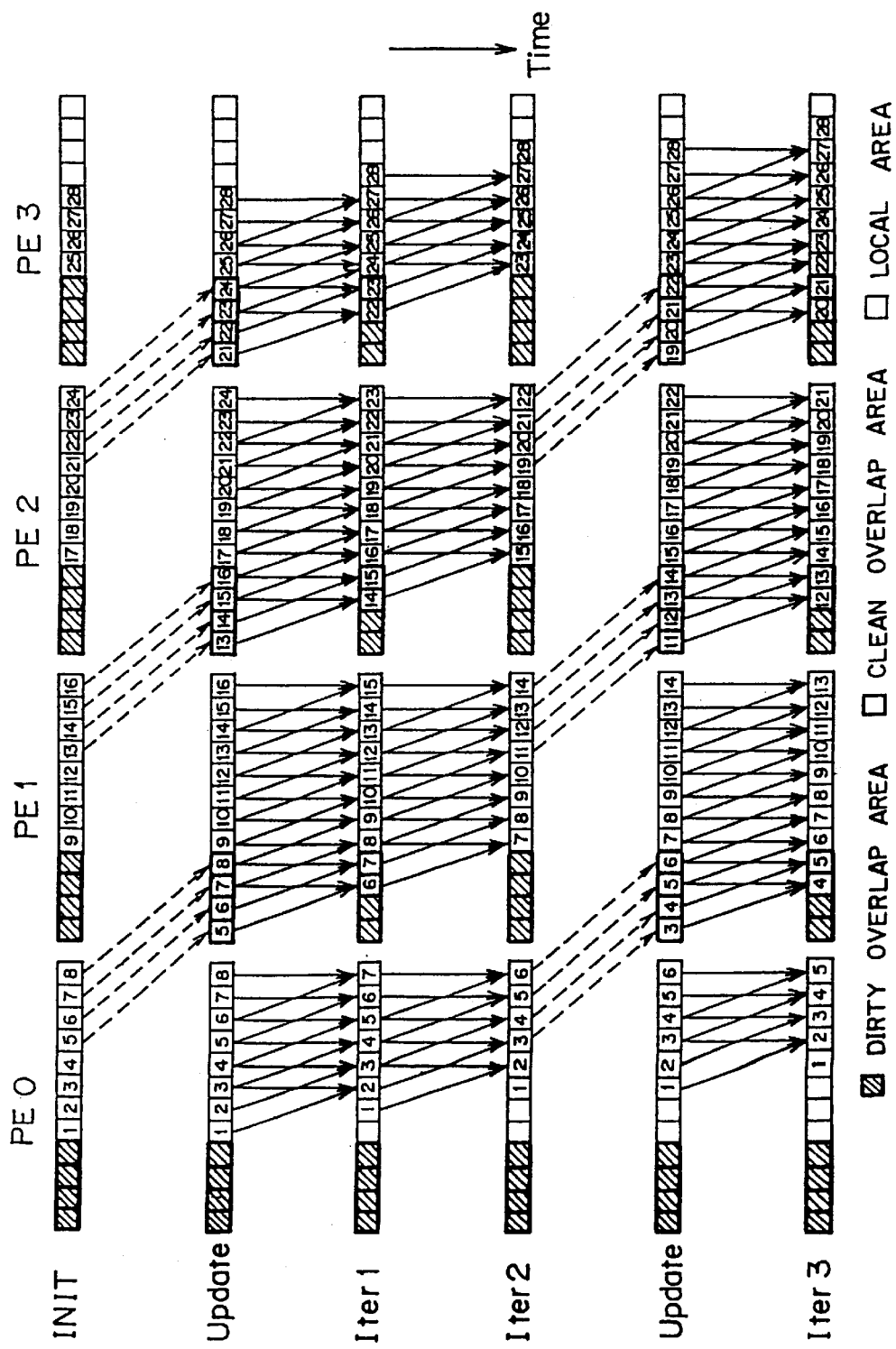
FIG. 25 shows the update of data using an extended overlap area and data transfer in a single direction.

FIG. 25 shows an example of updating data using both SDDT and extended overlap area when the program shown in FIG. 5 is executed. In FIG. 25, the meanings of the dirty overlap area, clean overlap area, local area, INIT, Update, and Iter 1, 2, 3, . . . are the same as those shown in FIG. 6.

For example, at the initial state, PE1 holds the elements in the range of a (9:16) in the array a in the local area, and has the storage area for the elements in the range of a (5:8) as an overlap area (INIT). Then, the PE1 receives the data from the PE0, updates the data in the overlap area, and transmits the data in the range of a (13:16) to the PE2 (Update).

Then, the PE1 makes the first calculation using the data in the range of a (5:16), updates the data in a (6:15) (Iter 1), and stores the data after shifting the storage position in the communications direction by 1. At this time, the data in a (16) initially stored by the PE1 is updated in parallel by the PE2. Then, the PE1 makes the second calculation using the data in the range of a (6:15), updates the data in a (7:14) (Iter 2), and stores the data after shifting the storage position in the communications direction by 1. At this time, the data in a (15) initially stored by the PE1 is updated in parallel by the PE2. Since the data in the extended overlap area have become all dirty, the PE1 established uni-directional communications between the PE1 and the adjacent PE, updates the extended overlap area, and performs the data update process for Iter 3.

According to the data update shown in FIG. 25, the data can be locally updated twice consecutively after the extended overlap area is updated through the communications. Therefore, the total volume of the transferred data is the same as that in FIG. 16. However, the overhead required for the communications can be reduced. In the example shown in FIG. 25, two overlap areas are added to the left of the overlap area of each PE shown in FIG. 16. An extended overlap area provided with additional overlap areas of an even number can also be used.

According to the present invention, the overhead synchronously used with the communications can be reduced when a parallel process is performed using an overlap area in a distributed-memory parallel processor, thereby realizing a high speed parallel process.

What is claimed is:

1. A parallel processor, having a plurality of processing elements and a communications network, for performing a parallel process through the plurality of processing elements, comprising:

data storage means for assigning a local area and an overlap area to each of the processing elements; and processing means for updating data in the local area and the overlap area through calculations performed by each processing element in multiple iterations using only the data in the local and overlap areas assigned thereto.

2. A data updating method in a data process using a parallel processor, having a plurality of processing elements and a communications network, for performing a parallel process through the plurality of processing elements, comprising:

storing data in a local area and an overlap area assigned to each of the processing elements;

performing multiple iterations of calculations by each processing element using only the data in the local and overlap areas assigned thereto to update the local and overlap areas each iteration: and updating, after said performing of the multiple iterations, the data in at least one overlap area assigned to a corresponding processing element using the data from an adjacent processing element.

3. A parallel processor, comprising:

a processor array of a plurality of processing elements, each accessing data in a local area and at least one overlap area;

a communications network connecting said processing elements; and a host computer controlling each of said processing elements to calculate new data for the local area and the at least one overlap area, to update the data in the at least one overlap area with a portion of the new data calculated by at least one adjacent processing element after the new data has been calculated in multiple iterations and then to repeat the multiple iterations and the update of the data in the at least one overlap area.

4. A parallel processor, comprising:

a processor array of interconnected processing elements, each calculating data for a local area and at least one overlap area in multiple iterations, then updating the data in the at least one overlap area with a portion of the data calculated by at least one adjacent processing element prior to repeating the calculating and the updating of the data.

5. A method of parallel processing, comprising:

assigning a local area and at least one overlap area to each of a plurality of processing elements;

calculating data for the local area and the at least one overlap area independently in each of the processing elements;

updating the data in the at least one overlap area of corresponding processing elements with a portion of the data calculated by at least one adjacent processing element after multiple iterations of said calculating; and repeating said calculating and said updating after completing said updating.

* * * * *